United States Patent
Surendran et al.

(10) Patent No.: US 7,809,704 B2
(45) Date of Patent: Oct. 5, 2010

(54) COMBINING SPECTRAL AND PROBABILISTIC CLUSTERING

(75) Inventors: Arungunram C. Surendran, Sammamish, WA (US); Suvrit Sra, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 11/453,744

(22) Filed: Jun. 15, 2006

(65) Prior Publication Data

US 2007/0294241 A1    Dec. 20, 2007

(51) Int. Cl.
G06F 17/30    (2006.01)
(52) U.S. Cl. .................. 707/706; 707/737
(58) Field of Classification Search .......... 707/706, 707/737
See application file for complete search history.

(56) References Cited

U.S. PATENT DOCUMENTS

| | | | | |
|---|---|---|---|---|
| 5,453,613 | A | 9/1995 | Gary | 250/281 |
| 6,233,571 | B1 | 5/2001 | Egger | 707/2 |
| 6,356,899 | B1* | 3/2002 | Chakrabarti et al. | 707/737 |
| 6,405,188 | B1* | 6/2002 | Schwartz et al. | 707/706 |
| 6,408,295 | B1* | 6/2002 | Aggarwal et al. | 707/694 |
| 6,460,035 | B1* | 10/2002 | Siegwart | 707/737 |
| 6,505,187 | B1* | 1/2003 | Shatdal | 707/737 |
| 6,581,058 | B1* | 6/2003 | Fayyad et al. | 707/737 |
| 6,691,112 | B1 | 2/2004 | Siegel | 707/3 |
| 6,701,318 | B2* | 3/2004 | Fox et al. | 707/706 |
| 6,704,722 | B2 | 3/2004 | Wang Baldonado | 707/3 |
| 6,751,624 | B2 | 6/2004 | Christal et al. | 707/101 |
| 6,778,982 | B1* | 8/2004 | Knight et al. | 707/737 |
| 6,834,278 | B2* | 12/2004 | Yu et al. | 707/737 |
| 6,836,768 | B1* | 12/2004 | Hirsch | 715/225 |
| 6,847,977 | B2* | 1/2005 | Abajian | 709/223 |
| 6,871,201 | B2* | 3/2005 | Yu et al. | 707/737 |
| 6,873,982 | B1* | 3/2005 | Bates et al. | 707/737 |
| 7,089,226 | B1* | 8/2006 | Dumais et al. | 707/3 |
| 7,311,666 | B2* | 12/2007 | Stupp et al. | 600/300 |
| 2002/0120429 | A1* | 8/2002 | Ortoleva | 703/2 |
| 2004/0034633 | A1 | 2/2004 | Rickard | 707/10 |
| 2004/0249810 | A1 | 12/2004 | Das | 707/5 |
| 2005/0102270 | A1 | 5/2005 | Risvik et al. | 707/3 |
| 2005/0118286 | A1* | 6/2005 | Suffin et al. | 424/752 |

(Continued)

FOREIGN PATENT DOCUMENTS

WO    WO0225574    3/2002

(Continued)

OTHER PUBLICATIONS

"Probabilistic Latent Semantic Indexing" by Thomas Hofmann. pp. 50-57.

(Continued)

*Primary Examiner*—Don Wong
*Assistant Examiner*—Kim T Nguyen
(74) *Attorney, Agent, or Firm*—Joseph R. Kelly; Westman, Champlin & Kelly, P.A.

(57) ABSTRACT

Data clustering is performed by executing a spectral technique, embedded within a probabilistic technique. In one embodiment, the probabilistic technique is performed by a generative model, and the spectral technique is performed within the generative model. In another embodiment, the probabilistic technique is performed by an aspect model, and the spectral technique is performed within the aspect model.

19 Claims, 7 Drawing Sheets

U.S. PATENT DOCUMENTS

2005/0165780 A1 7/2005 Omega .......................... 707/7
2006/0031195 A1 2/2006 Patterson ...................... 707/3
2007/0165920 A1* 7/2007 Gering et al. ............... 382/128

FOREIGN PATENT DOCUMENTS

WO   WO2004038602   5/2004

OTHER PUBLICATIONS

"Indexing by Latent Semantic Analysis" by Scott Deerwester et al., pp. 1-iii.
"Authoritative Sources in a Hyperlinked Environment" by Jon M. Kleinberg 1999 ACM, vol. 46, No. 5, pp. 604-632.

* cited by examiner

COMBINING SPECTRAL AND PROBABILISTIC CLUSTERING

BACKGROUND

In current computing technologies, it is often useful to cluster data. In order to cluster data, a data corpus that contains a number of different objects is presented for clustering. Hidden groups within the data objects are identified and those groups form clusters.

There are a variety of different clustering techniques that find many different applications in current computing technologies. For instance, assume that the group of objects presented for clustering is a group of documents which are to be clustered in terms of topics. The documents and the words in the documents are referred to as observed values because they can be seen by a user. However, the topics or clusters are hidden values because the user does not obviously see the topics from the observed data. Clustering is the act of identifying the hidden topics in the observed data. Therefore, in this example, clustering is the act of finding topics referred to by the various documents in the data set and grouping the documents relative to those topics.

Clustering is often referred to in terms of "hard clustering" and "soft clustering". Hard clustering means that a data object can only belong to a single cluster, and to no other cluster. Soft clustering means that a single data object can belong to multiple clusters, and the membership in each of those clusters is described using partial numbers, or fractions. For instance, if a document to be clustered discusses traveling to Miami for the Superbowl, the document may belong to a topic cluster identified as "travel" and to a topic cluster identified as "sports". A soft clustering of the document might indicate that the document belongs to the "travel" cluster with a probability of sixty percent and that it belongs to the "sports" cluster with a probability of forty percent.

Data ranking presents a problem similar to that of clustering. For instance, when one wishes to find all documents that are important to the topic of "travel", one might desire to have all the documents in the data set ranked according to relevance with respect to travel. Ranking the documents might provide results that indicate that a given document is relevant with a probability of 0.9 with respect to the topic of travel, while another document is relevant with a probability of 0.8, or 0.7, etc. It can thus be seen that creating a ranking of this type, based on relevance, can also be thought of as a soft cluster, in that documents can be relevant to multiple topics (i.e., belong to multiple clusters) to a varying degree.

Indexing also presents a similar problem to that of clustering and ranking. Indexing is the process by which a reduced representation of a document is created for easy storage and retrieval such that the distances between documents in the complete representation are preserved as much as possible. This can be done through clustering, or in other ways.

In the past, there have been substantially two methods for ranking, indexing or clustering. The two kinds of methods are spectral methods and probabilistic methods. In general, a spectral method refers to a technique that extracts eigenvectors, eigenvalues, singularvalues, or singular vectors from a matrix. One example of a spectral method is latent semantic indexing (LSI) which is commonly used for document indexing. Another currently known type of spectral method is referred to as the "HITS" method which is used to rank web pages as authority or hub pages.

Spectral methods have a number of advantages. For instance, they have been shown to be optimal in the sense that they can capture the most information possible given the reduced representation of the data. Also, under some conditions, a spectral method always converges to a globally optimum solution. Further, there are fast methods that exist to solve spectral problems, and since eigenvectors are orthogonal, spectral methods like latent semantic indexing, when applied to documents, give topics with minimum overlap.

However, spectral methods do have some disadvantages. They do not have probabilistic interpretation, which can be very useful when making decisions among multiple systems. Similarly, systems like latent semantic indexing do not allow sharing among representations in the same way that probabilistic models do. Also, spectral methods generally require some type of external restriction and guidance, and spectral clustering generally provides a hard clustering output.

The second type of technique for clustering, ranking, and indexing is the probabilistic technique. A probabilistic technique uses probabilistic, statistical models as generative models to represent the data. Examples of commonly known probabilistic techniques are latent Dirichlet allocation, and probabilistic latent semantic indexing (PLSI).

In general, the advantages associated with probabilistic techniques are simply the opposite of the disadvantages of the spectral methods mentioned above. However, the probabilistic techniques have disadvantages as well. Since they do not have an orthogonal representation, the clusters can be mixed with one another. Similarly, probabilistic techniques do not have the discriminative power of spectral techniques and therefore the generative models tend to be descriptive and explanatory.

The discussion above is merely provided for general background information and is not intended to be used as an aid in determining the scope of the claimed subject matter.

SUMMARY

Data clustering is performed by executing a spectral technique, embedded within a probabilistic technique. In one embodiment, the probabilistic technique is performed by a generative aspect model, and the spectral technique is performed within the generative model. In another embodiment, the spectral technique is performed within a ranking model, and the probabilistic technique is performed considering the ranking model as a non-generative aspect model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
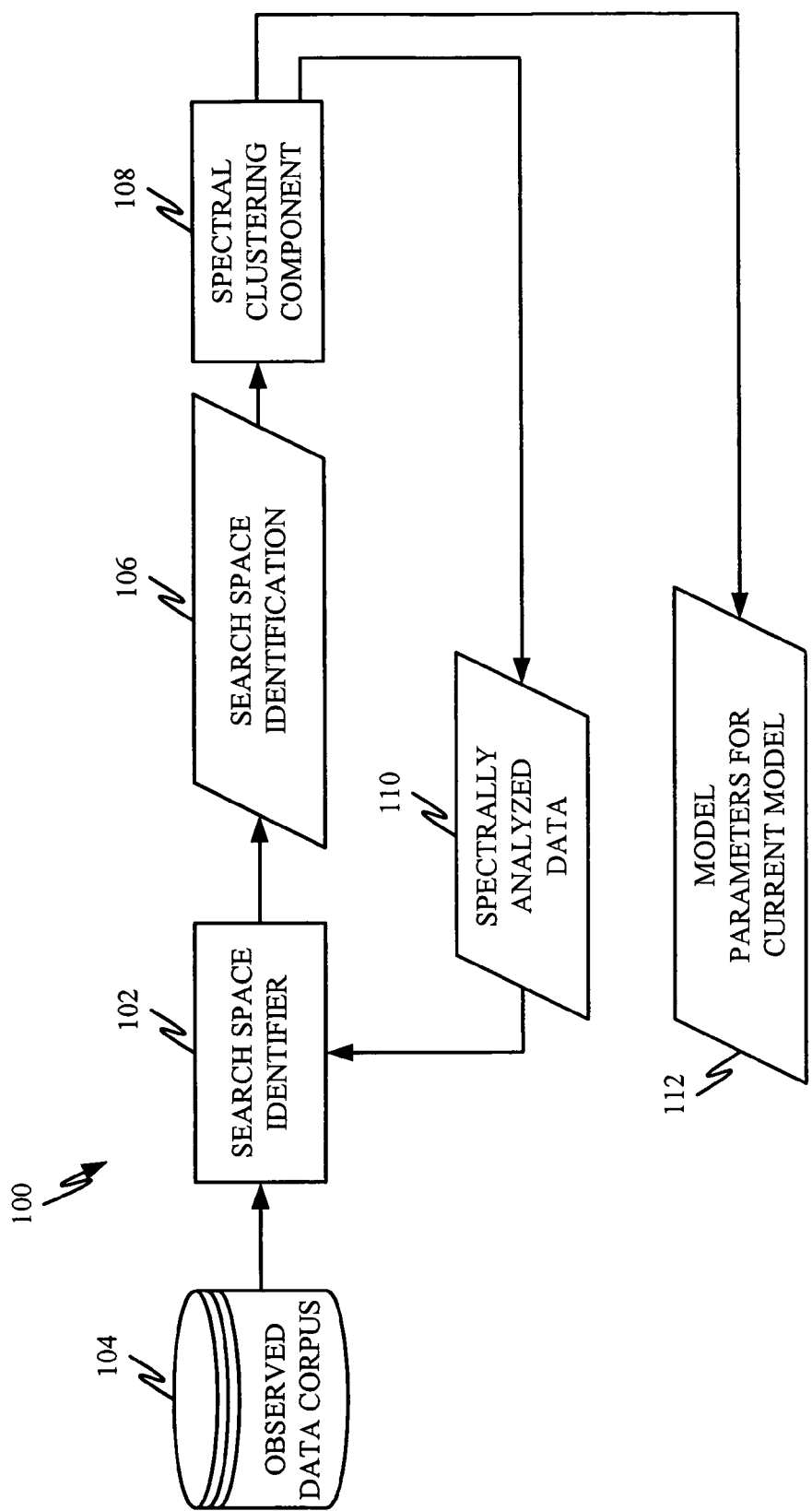
FIG. 1 is a block diagram illustrating one illustrative clustering system.

FIG. 1 is one illustrative block diagram of a data clustering system 100. While system 100 is referred to as a "clustering" system it will be noted that data clustering, ranking, and indexing all address a similar problem, and therefore the system shown in FIG. 1, in various embodiments, can be used to at least address each of these different problems. Therefore, while the system is referred to with respect to FIG. 1, and in the present description, as a "clustering" system, it is not to be so limited, but the term "clustering" will be deemed to include indexing and ranking. System 100 and its operation will first be described in general terms. It will then be described below in greater detail with respect to a number of exemplary embodiments.

In any case, system 100 includes a search space identifier 102 that is shown connected to a data store that stores an observed data corpus 104. Search space identifier 102 provides search space identification 106 (defining the search space as will be discussed in greater detail below) to a spectral clustering component 108. Spectral clustering component 108 finds clusters in the data identified by the search space identification 106 and provides spectrally analyzed data 110 back to search space identifier 102. Spectrally analyzed data 110 identifies a cluster in the identified search space and an indication of how well each item of data in the identified search space is represented by that cluster (e.g., how relevant the item of data is with respect to that cluster).

It will be noted that the output of system 100 need not only be the clustered (or spectrally analyzed) data 110 with, for example, relevance scores, but can also include model parameters 112 for a current model or for a plurality of current models, that describe or otherwise represent the observed data in corpus 104 in defined clusters, and that can be used to cluster additional data or to find additional clusters during subsequent processing.

Figure 2:
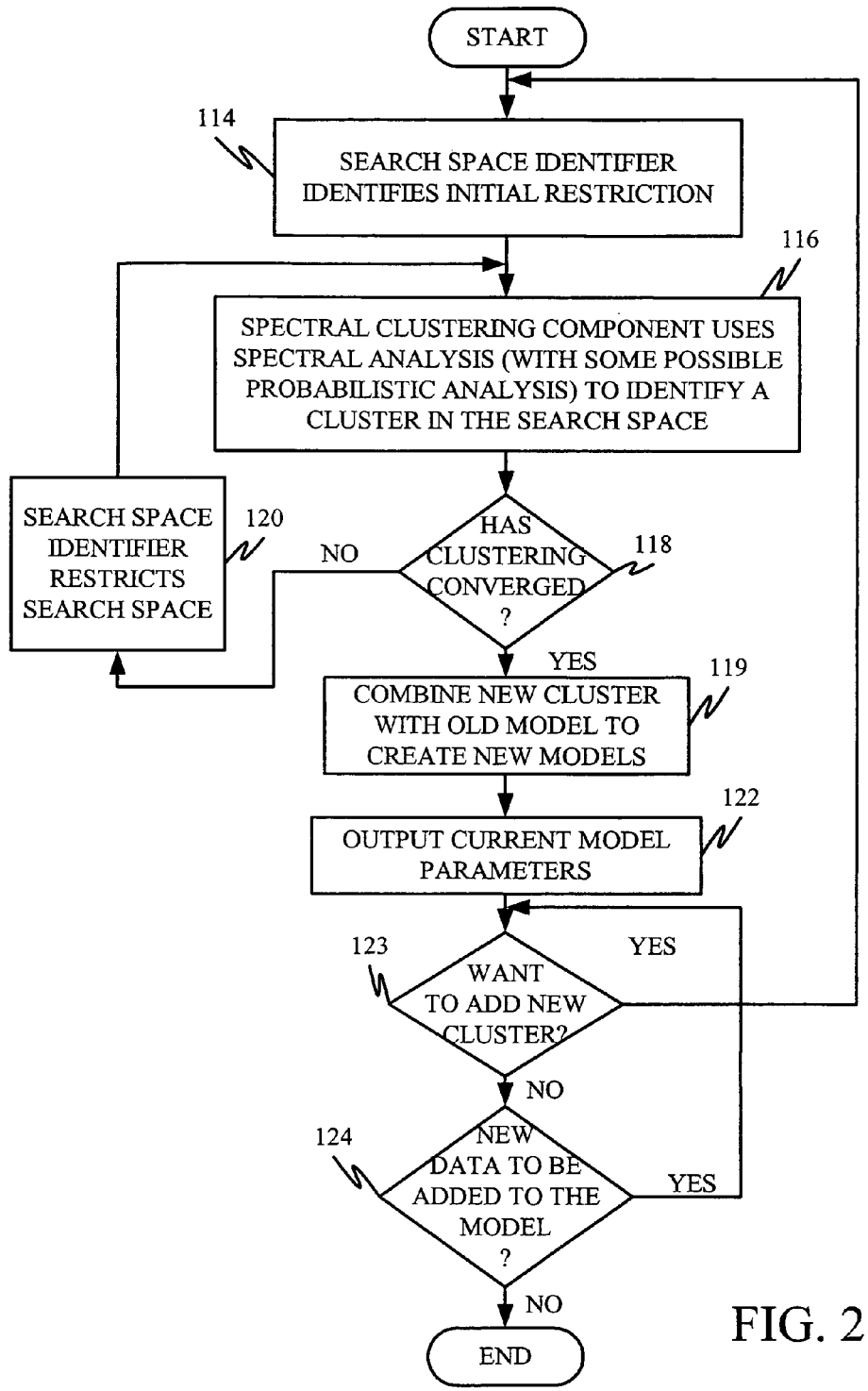
FIG. 2 is a flow diagram illustrating one embodiment of the overall operation of the system shown in FIG. 1.

FIG. 2 is a flow diagram illustrating one embodiment of the overall operation of system 100 shown in FIG. 1. The goal of the operation of system 100 is to find clusters in the observed data in corpus 104. The clusters will illustratively be data points that belong together, or share some properties. In performing this clustering, search space identifier 102 first executes a portion of a technique that identifies part of the observed data in corpus 104 that needs to be searched for clusters. This is indicated by block 114 in FIG. 2. In other words, search space identifier 102 helps to place restrictions on the search space in corpus 104, based on whether some of the data in corpus 104 is already well described by models of previously found clusters.

As an initial restriction, if no models have been generated that describe any part of the observed data in corpus 104 (i.e., if no clusters have been identified yet) then the initial restriction identified by search space identifier 102, in block 114, will simply be the entire data set. That is, search space identifier 102 will provide the search space identification 106 that indicates that spectral clustering component 108 is to search the entire data set for a cluster. However, as discussed below following block 124, there may have already been models generated. In that case, search space identifier 120 down weights data points in corpus 104 that are well represented by the models generated earlier. This is indicated by block 114 as well.

In any case, once the search space has been identified, clustering component 108 then preliminarily identifies a cluster (or a group) within the identified search space 106 as spectrally analyzed data 110. Of course, component 108 can also rank the data items or nodes in the search space to indicate a relevance with respect to a given cluster. This is done using a spectral technique and is indicated by block 116 in FIG. 2.

Search space identifier 102 then determines whether clustering has converged as indicated by block 118. That is, after the data nodes are scored or ranked at block 116, it is determined whether another iteration of refining the search space and re-ranking the data nodes will improve the model by a threshold amount. If not, clustering for the present cluster is complete, and the present cluster is well defined. Processing continues at block 119 as discussed below. However, assuming that it is determined that another iteration of refining the search space and re-ranking the data nodes is warranted, then processing moves to block 120.

The initial restrictions placed on the search space by search space identifier 102, at block 114, may be done using a probabilistic technique, a non-probabilistic technique or using a combination of probabilistic and non-probabilistic techniques. For instance, if prior models have been generated, and the data nodes in corpus 104 have associated scores indicative of relevance to the prior models, search space identifier may initially restrict the search space simply based on those scores.

Assume, for the sake of the present discussion, that clustering has not yet converged at block 118. In that case, search space identifier 102 then uses the current cluster to further restrict the search space in the corpus of observed data 104. This is indicated by block 120 in FIG. 2. In other words, the most recent cluster under consideration will have data nodes ranked according to how well the cluster will explain those data nodes in observed data corpus 104. Therefore, search space identifier 102 uses a probabilistic technique to identify the data that is well explained by the most recent cluster under consideration (or well modeled by the most recent model for the cluster) and refines the search space accordingly. In one embodiment, search space identifier 102 emphasizes (or up-weights) data nodes well represented by the current model and submits them to spectral clustering component 108 for re-ranking. Thus, system 100 operates in a loop with boxes 116, 118 and 120 refining and re-ranking the objects in a cluster to define a subset of those objects that actually define the cluster.

Once clustering has converged, then the new cluster has been adequately defined. Clustering component 108 then combines the new cluster with the previous model to obtain or create a new model. This is described in greater detail below with respect to Eq. 2 and is illustrated by block 119 in FIG. 2. The current model or model parameters are then output as shown at block 122. When the model or model parameters are output, then those nodes in corpus 104 that do not yet belong to a cluster (or those nodes not well described by the current models or clusters) are distinguished from those that are. Search space identifier 102 then determines whether another cluster is to be found. In doing so, search space identifier 102 determines whether adding the most recent cluster has meant that the models being generated represent the observed data in corpus 104 well enough. This can be determined based on any desired metric or algorithm. If so, then no new clusters need to be added for the current data in corpus 104.

If not, then another cluster is to be found in the data corpus 104. Processing thus reverts to block 114 where search space identifier 102 uses a probabilistic, non-probabilistic or combination approach, to limit the search space for the new cluster. Search space identifier 102 identifies the data nodes in corpus 104 that are well explained by the current clusters (or modeled by the current models).

In one embodiment, these data nodes are completely removed from analysis by clustering component 108. In another embodiment, however, all of the data nodes are still available for analysis by clustering component 108, but probabilistic search space identifier 102 identifies certain nodes for preferential consideration by clustering component

108. In one embodiment, identifier 102 simply weights the nodes so that the data nodes that are not well described by a current cluster (or model) are weighted higher and therefore given more consideration by spectral clustering component 108 in identifying a new cluster, while the data nodes that are well described or explained by a previous cluster (or model) are weighted lower so that they are not given high consideration by spectral clustering component 108 as potentially belonging to the new cluster.

In any case, probabilistic search space identifier 102 imposes a new restriction on the data to limit the search space and provides an identification 106 of that limited search space to spectral clustering component 108. Spectral clustering component 108 then uses spectral analysis (with optionally some probabilistic analysis) to identify a cluster in the identified search space as indicated by block 116. This processing loop of limiting the search space and identifying clusters in the limited search space continues until no more clusters are to be generated for the current set of data as indicated at block 123 in FIG. 2.

Once clustering has converged, then the model parameters associated with each of the identified clusters, (i.e., the models that describe those clusters) is output by system 100. This is indicated by block 122 in FIG. 2, and is illustratively shown at 112 in FIG. 1.

Using the technique described above with respect to FIGS. 1 and 2, clusters can be added one at a time. In other words, system 100 does not analyze all of the data at once and identify all of the different clusters in the data in a single pass. Instead, the system identifies a cluster in a given search space. The data corresponding to that cluster is then down-weighted and the system identifies another cluster in the data, focusing on the data that has not yet been associated with a cluster. This continues until all clusters are identified when a stopping criteria is reached, at which point the clustering is ended.

Because the clusters are identified one at a time, new data can easily be added to the system. For instance, assume that in FIG. 1 a new set of data is to be added to the data corpus 104. That data can easily be clustered, without recomputing the entire model (or models) that has already been computed to cluster the previous data. Determining whether new data is to be added to the model is indicated by block 124 in FIG. 2.

If so, spectral clustering component 108 then analyzes the new data identified in the search space to determine whether it can be described by the clusters previously identified, or whether more clustering needs to be performed. This is indicated by block 123. For instance, if clustering component 108 identifies a cluster in the new data, and that cluster identifies the new data better than any of the previously defined clusters, then the new cluster will be added to the model. However, if the current model (i.e., the current set of clusters) already describes the new data sufficiently well, new clustering will not be performed for the model. This can be done relatively quickly and easily, any time a new data set is added to data corpus 104.

If more clusters are to be found, processing reverts to block 114 where search space identifier 102 identifies an initial restriction on the search space in data corpus 104. As the initial restriction, search space identifier 102 will identify that the previously-computed models already describe a large part of observed data corpus 104, and will therefore focus spectral clustering component 108 on the new data that has been added to observed data corpus 104. Clusters are located until a stopping criterion is reached at block 123.

It should be noted that some functions described above need not be performed by the components mentioned but can be performed by different components. For instance, convergence and determining whether more clusters are to be found, as well as combining a new cluster into an existing model, or deleting and already existing cluster can be performed by any component shown or by separate components.

Figure 3:
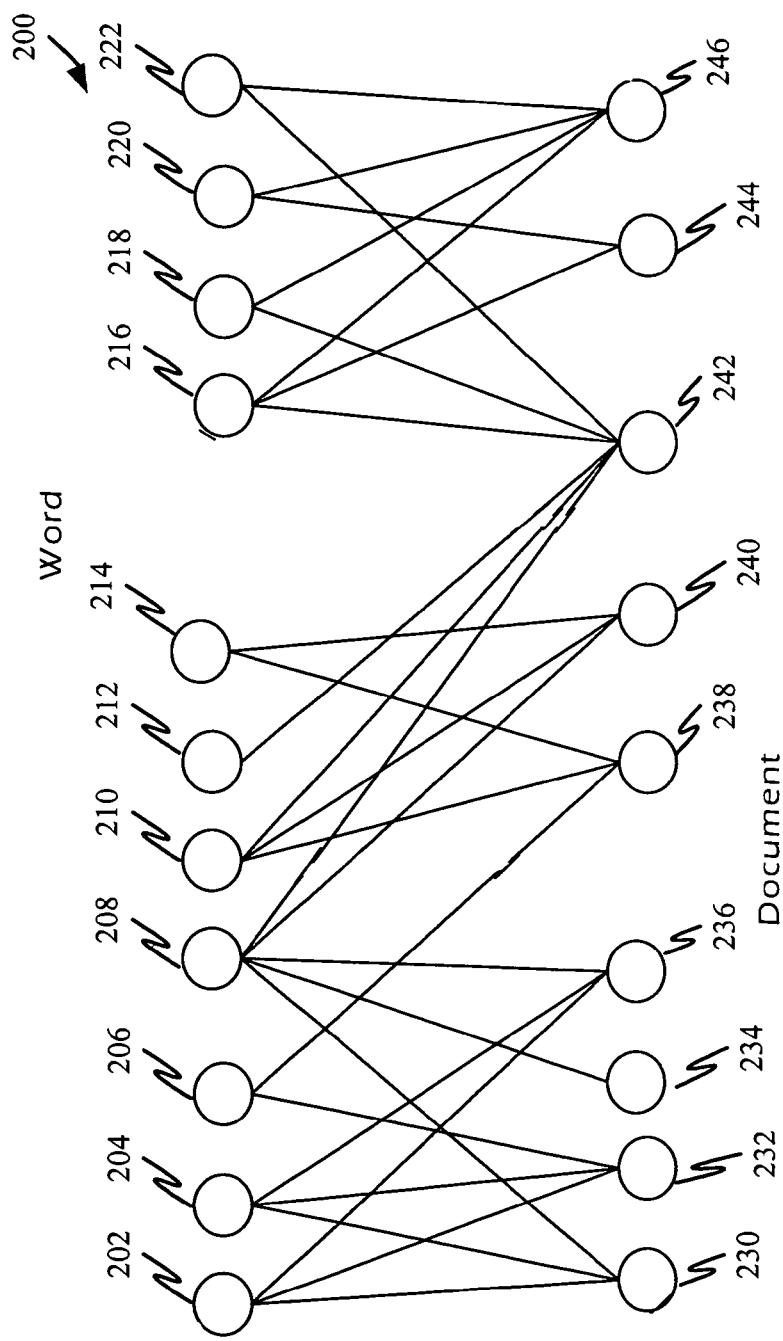
FIGS. 3-6 graphically illustrate exemplary clustering.

The present invention will now be discussed with respect to one exemplary embodiment illustrated in FIGS. 3-6. FIG. 3 is a bi-partite graph 200 which represents a set of documents, containing words, that are to be clustered according to topic. Bi-partite graph 200 shows a set of nodes 230-246 which represent the set of documents to be analyzed, and a set of nodes 202-222 which represent the words that are contained in documents 230-246. A word-document pair is linked by a line if the word represented by the linked node is contained in the document to which it is linked.

The strength of the link is illustratively weighted. This weight can be based on many different factors. One weight accounts for the frequency with which the linked word is identified in the linked document, as well as the frequency with which the linked word appears in all documents. One exemplary way to weight the links is to use the term frequency-inverse document frequency counts (the tf*idf counts). This is a well-known technique. Briefly, the term frequency is the number of times that the word occurs in the document, and the inverse document frequency is the inverse of the fraction of the documents in which the word occurs. For instance, if there are 1000 documents, and the word "cluster" occurs in only 10 documents, then its idf value is 100 (1000/10=100). Assume, for example, that the word "the" occurs in every document. Then its idf weight is only 1 (1000/1000=1).

In any case, when a group of words and documents are tightly linked to one another, they strongly co-occur with one another, and they should together represent a concept or a topic. In this embodiment, tightly linked sets of words and documents are clustered as "topics." However, there are other definitions of a cluster that can be obtained with a variety of different spectral techniques. For instance, while the spectral approach described below calculates a highest eigenvector, other algorithms can use the second smallest or second largest eigenvector or others, depending on a desired cluster result.

In any case, the present exemplary embodiment clusters tightly linked words and documents into concepts or topics. Clustering system 100 discovers such groups, and identifies each such group as a cluster. It will be noted, of course, in some embodiments, the clusters should illustratively be overlapping so that each word can belong to more than one topic, and so that each document can belong to more than one topic. For example, an article regarding flying to Tampa for the Superbowl is both about travel and sports. Therefore, that document should be able to belong to both clusters. This is referred to as soft clustering and probabilistic models allow this soft clustering.

Within each cluster, system 100 illustratively ranks the words and documents according to which ones are most important and which ones are less important relative to the cluster. This can be used to create a descriptive summary of the topic (or cluster) as well as to rank the data objects within the cluster (i.e., to rank the documents according to their relevance to the given topic). Finally, once the descriptive summaries are obtained, those summaries can be used to index the documents to the different topics.

In accordance with this example, system 100 will be described within the context of estimating an aspect model using an expectation maximization (EM) algorithm. Before describing the invention in greater detail, a brief description of the EM algorithm will be undertaken.

EM algorithms are used for automatically learning an unknown model, without external help. In other words, a user presents data to the EM algorithm and the EM algorithm operates on the data to automatically find clusters or groups in the data, and model parameters that define models that represent the clusters. The data that is presented to the algorithm is referred to as the "observed data" that has "observed values", simply because these values can easily be seen and known. In the context of the present example, the words and documents are the observed values.

However, there are some hidden values which are not known and it is the job of the EM algorithm to find them. In the present example, the topics that the documents belong to are hidden, and consequently the memberships of the documents or words in those various topics are also hidden. In sum, the user does not know what the hidden topics are and the user does not know how much of each document belongs to each topic, keeping in mind that the membership of a given document in any given topic can be a partial membership.

The goal of the EM algorithm is to find a model (that can be conceptualized with model parameters that describe models) that represent each topic. However, these models or parameters cannot be estimated directly since they depend on the partial hidden membership values. Therefore, the EM algorithm makes an initial guess of the hidden membership for each of the documents in the identified topics. This is referred to as the E-step. In the conventional EM algorithm, the algorithm assumes that this guess is true and estimates the model parameters given the guess. This is referred to as the M-step. In this type of conventional EM algorithm, the algorithm does its best to estimate the parameters, assuming that the memberships are true (which is a guess), and it cannot refine or correct those memberships in anyway.

The EM algorithm then returns to the E-step and re-estimates the membership values given the model parameters just estimated. This cycle continues until an objective level of "goodness" is met at which point the EM algorithm concludes, and the most current model or model parameter estimations are output.

In accordance with one embodiment, the present system replaces the conventional M-step with a spectral algorithm. The spectral algorithm can be thought of as identifying a cluster in the data presented by the E-step. The cluster is illustratively a soft cluster in that the M-step (the spectral algorithm) ranks the data nodes form high to low in terms of their relevance to the current cluster or topic being identified. Then, processing returns to the E-step, and the E-step uses these rankings to again recommend membership of the data nodes within the identified cluster. However, the spectral M-step need not take this as absolutely true. Instead, the E-step weights the data nodes and this weight is considered by the M-step in finding additional clusters.

Referring again to FIGS. 1-3, the data in bi-partite graph 200 is to be clustered. Search space identifier 102 initially places no restrictions on the search space for which clusters are to be identified. Therefore, all of the nodes are equally weighted, and spectral clustering component 108 executes the M-step on all of the data in graph 200. The E and M steps are iteratively repeated to define a cluster.

Figure 4:
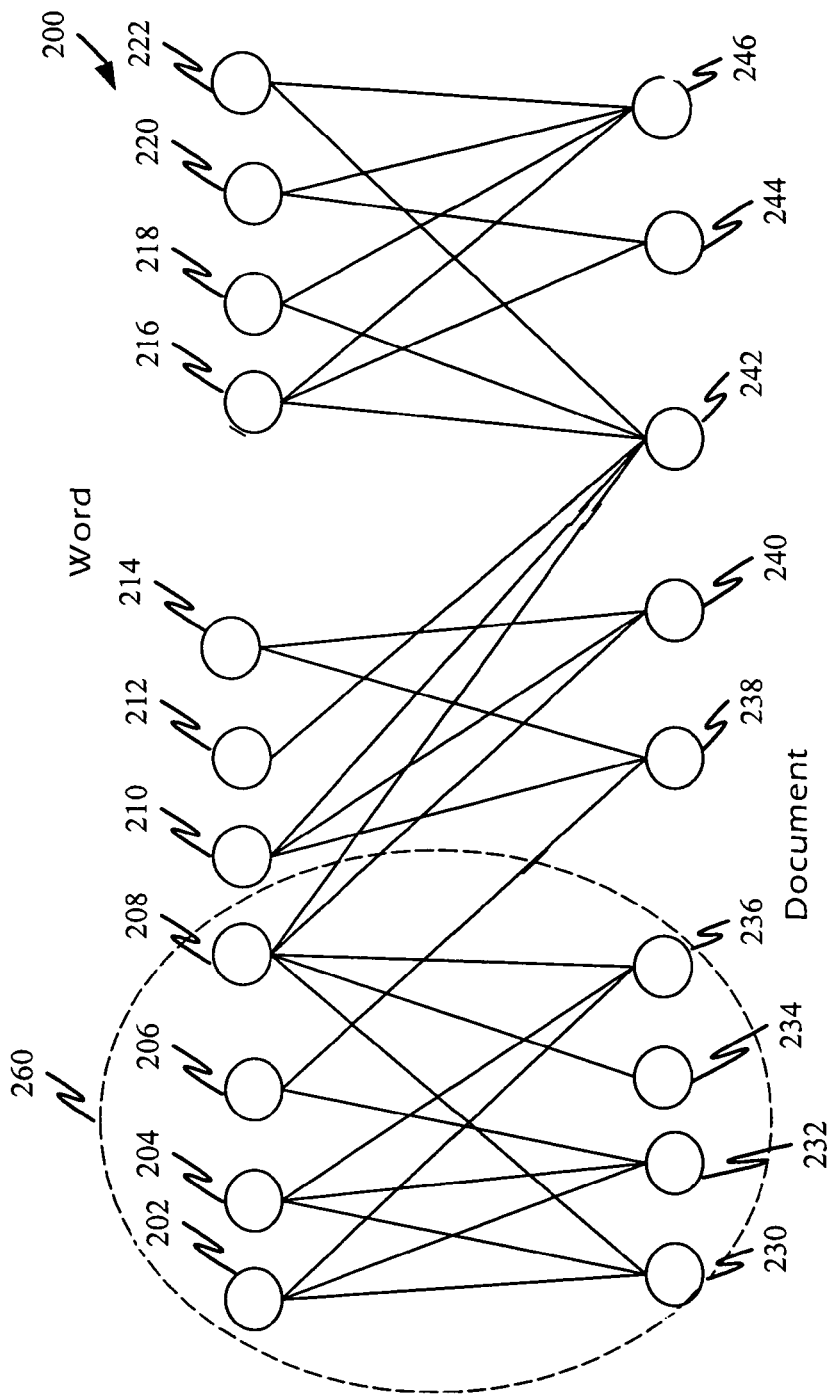

FIG. 4 shows that spectral clustering component 108 has identified word nodes 202-208 and document nodes 230-236 as being tightly linked and having a high relevance with respect to cluster 1 (illustrated by 260) in FIG. 4. In other words, spectral clustering component 108 has ranked the word nodes 202-208 and the corresponding document nodes 230-236 high, relative to the remaining nodes, in terms of their relevance to the topic identified by cluster 260. These ranking values are returned as spectrally analyzed data 110 to search space identifier 102, and search space identifier 102 identifies the highest ranking nodes as belonging to cluster 260. Search space identifier 102 then relatively re-weights the nodes in cluster 260. In one embodiment, search space identifier 102 increases the weights on the remaining nodes. In this way, search space identifier 102 is restricting the search space (as shown in step 120 in FIG. 2) by indicating to spectral clustering component 108 that it should focus more on the unclustered nodes, than on those nodes which are well explained by cluster 260. In other words, search space identifier 102, in performing the E-step, is indicating that the portion of the data corpus that is not yet well explained by any of the topics previously identified should be searched more closely by the spectral clustering component 108 to identify a new topic (or cluster).

Figure 5:
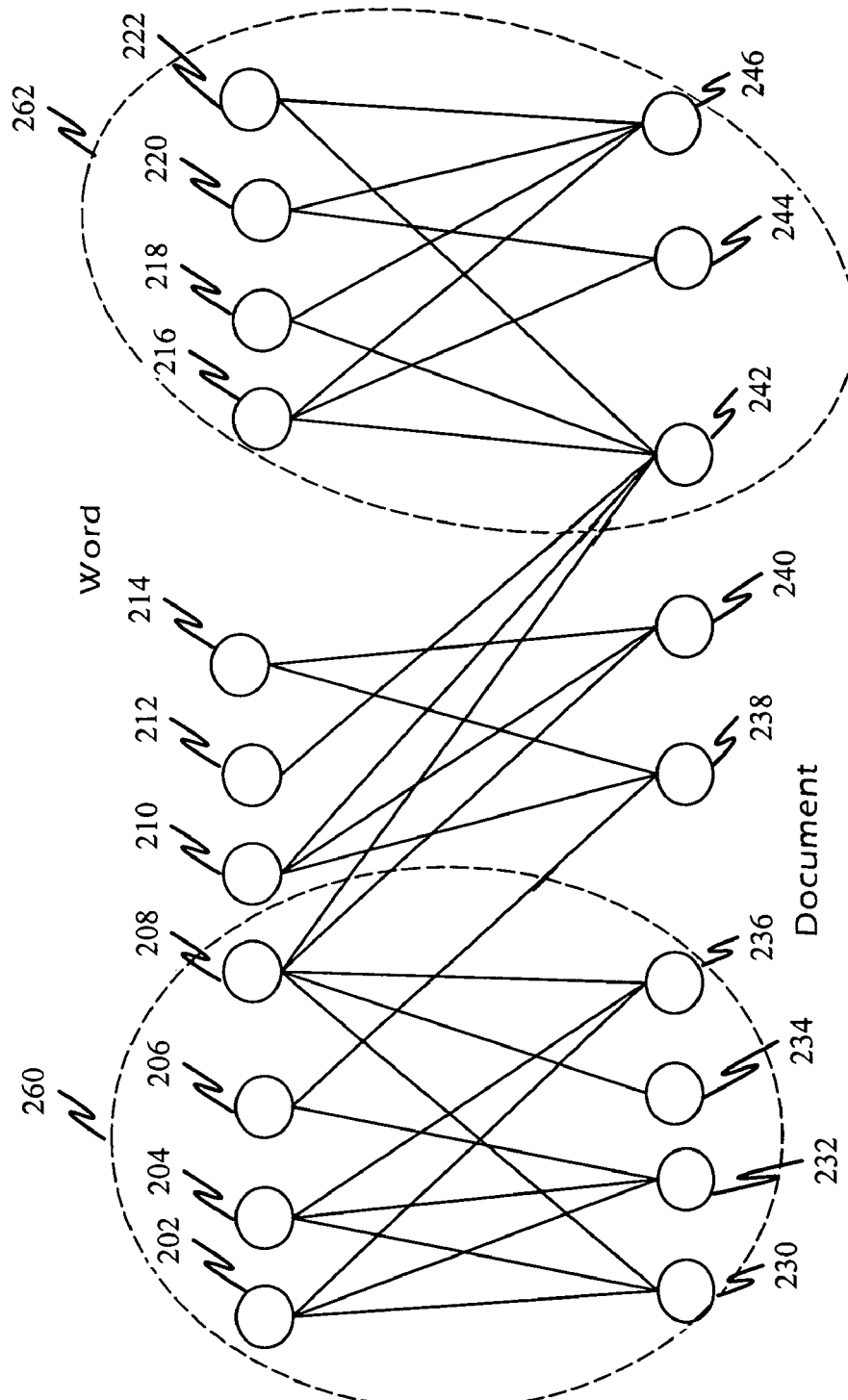

Spectral clustering Component 108 then examines the nodes in bi-partite graph 200, examining the unclustered nodes 210-220 and 230-246 more carefully than the clustered nodes. These search space restriction and data node re-ranking steps are iteratively repeated. In doing so, component 108 finds a second cluster 262 as shown in FIG. 5. Cluster 262 shows that word nodes 216-222 and document nodes 242-246 have been ranked high relative to the remaining nodes, by spectral clustering component 108, as having a high degree of relevance to the second topic being processed (i.e., relative to cluster 262).

This ranking is provided by spectral clustering component 108 back to search space identifier 102 as spectrally analyzed data 110 and search space identifier 102 determines whether clustering has converged as indicated by block 118 in FIG. 2. Once converged, the second cluster is defined.

It is then determined whether another cluster is to be found. In the example being discussed, clustering continues. Therefore, search space identifier 102 uses the ranking provided by spectral clustering component 108 to indicate that cluster 262 now describes data nodes 216-222 and 242-246 well. Therefore, those nodes are relatively down-weighted along with the nodes identified in cluster 260. Thus, search space identifier 102 has further restricted the scope of search for spectral clustering component 108, in the E-step. This is indicated by block 120 in FIG. 2.

Spectral clustering component 108 then performs another M-step by focusing more heavily on nodes 210-214 and 238-240, which are not yet well explained by either cluster 260 or cluster 262, which have previously been found. These steps are iteratively repeated, and spectral clustering component 108 identifies a third cluster and ranks the nodes in the data set relative to their relevance with respect to the third cluster. The nodes that have a high degree of relevance with respect to the third cluster are shown as cluster 264 in FIG. 6. The ranking of the nodes is provided from spectral clustering component 108, as spectrally analyzed data 110, to search space identifier 102. In one embodiment, the ranking provided by spectral clustering component 108 is illustratively converted into gradations in probability by search space identifier 102. Based on those probabilities, search space identifier 102 identifies which of the nodes belong to the cluster identified by spectral clustering component 108. Those nodes will be the ones very well represented (having a high degree of probability) by the cluster, and search space identifier 102 identifies the high ranking nodes 208-214 and 238-242 as belonging to cluster 264.

Figure 6:
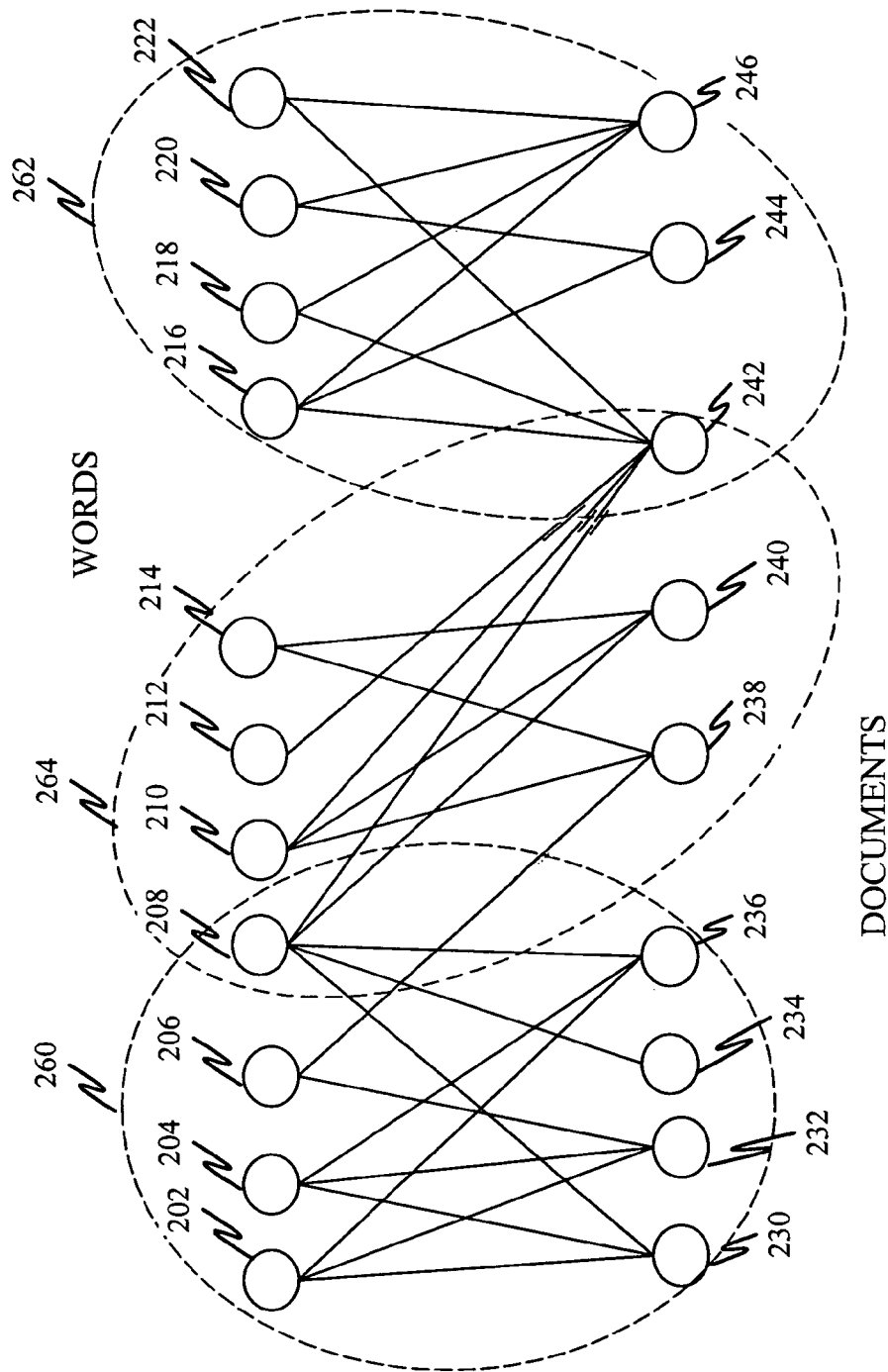

If, as in the example shown in FIG. 6, all of the data nodes in the data set have been assigned to a cluster, then clustering will, as a matter of fact, have converged. Alternatively, the spectral clustering component 108 can be asked to identify yet another cluster, and search space identifier 102 will then determine that the additional cluster does not describe any of the data nodes any better than the previous clusters 260, 262 and 264, and search space identifier 102 will also determine that clustering has converged, in that case.

It can thus be seen that, in the context of the EM algorithm, the E-step (such as block 120 in FIG. 2) is used as a step to restrict the search space searched during the M-step (such as block 116 in FIG. 2). In other words, the E-step outputs an indication of which parts of the data are already well explained by clusters, and which parts are not. The spectral M-step is then used to discover a new cluster in this restricted space. In the conventional EM algorithm for aspect models, the M-step is not a discovery step. Instead, it assumes that the groupings provided by the E-step are accurate and simply estimates parameters based on those given restrictions. With the present embodiment, the M-step is discovering clusters. It can also search all nodes, though some are simply weighted lower than others by search space identifier 102.

These new E and M steps can be iterated on until some "goodness" criterion is satisfied. The new procedure has a number of advantages over a conventional EM algorithm for aspect models. First, the clustering has been viewed to be more accurate. Similarly, depending on some properties, the new algorithm is more predictable and gives repeatable results on the same data, which is not true of the conventional EM algorithm. Similarly, with the present system, the model can be built incrementally, as more data is added. This is very important in some applications.

The present system can be used with manual restrictions as well. In other words, it is described above with fully automatic restrictions being provided by search space identifier 102. However, the restrictions and models can periodically be reviewed by a human, or other restriction entity, and additional restrictions can be placed on spectral clustering component 108, that are different from, or in addition to, those provided by search space identifier 102.

The invention will now be described in more detail with respect to a derivation of aspect models. Aspects only refer to hidden clusters so need not represent probabilistic generative models. A probabilistic approach can, but need not be, used. Instead, simple ranking functions can be used. A modified EM algorithm can be used as follows.

Assume that the input to system 100 is a set of documents $D=\{d_1, d_2, \ldots, d_N\}$ (such as those shown in the bi-partite graph in FIGS. 3-6), and that each document is represented by a M-dimensional vector of words taken from a vocabulary $W=\{w_1, w_2, \ldots, w_M\}$ (again, such as those in FIGS. 3-6). The data is represented by a word-document co-occurrence matrix of size M×N. The frequency of word w in document d is given by $n_{wd}$ (or appropriately weighted versions of frequency such as tf*idf). It will be noted that M and N can increase or decrease as new documents are added or older documents are deleted. Assume that the documents are to be clustered by system 100 according to topics or themes.

The aspect model discussed in this exemplary embodiment is a latent variable model where the word and document probabilities are conditionally independent given the aspect (or theme) z. Each theme is represented by the distribution of words, p(w|z), and each document is a mixture of themes. The joint word-document probability P(w,d) is decomposed as follows:

$$P(w, d) = \sum_{k=1}^{K} P(z_k)P(d \mid z_k)P(w \mid z_k) = \text{first } K-1 \text{ terms} + K^{th} \text{ term,} \quad \text{Eq. 1}$$

-continued
$$F_k = (1 - \alpha)F_{k-1} + \alpha h_k. \quad \text{Eq. 2}$$

where there are K aspect variables $z_k$, and $\alpha = P(z_k)$ gives the prior probability that any word-document pair belongs to the kth aspect $z_k$. Thus, to build the model F as set out in Eq. 2 in an incremental fashion one illustrative technique proceeds by estimating the distribution of individual aspects $h_k$ (k=1, 2, ...). Tying this back to the flow diagram of FIG. 2, $F_k$ is the new model, $F_{k-1}$ is the old model, and $h_k$ is a new cluster. The term $\alpha$ indicates how to combine the old model with the new cluster to generate the new model as in box 119 of FIG. 2.

In one embodiment, this estimation is done incrementally. If the current estimate of P(w,d) is given by $F_{k-1}(w,d)$ then, h and $\alpha$, can be computed to obtain $F_k$ using Eq. 2. A natural objective function for this estimation is the empirical log-likelihood $$\sum_{wd} n_{wd} \log P(w, d),$$

which may be written as follows:

$$L(F) = \sum_{w,d} n_{wd} \log((1-\alpha)F_{k-1}(w,d) + \alpha h(w,d)). \quad \text{Eq. 3}$$

L(F) can be optimized over h and $\alpha$. Alternatively, other optimization functions can be used. Instead of maximizing the log-cost, an approach known as gradient approach (the specific method used here is called a functional-gradient approach) proposes to compute a new h,$\alpha$ so that there is an improvement in L(F) as computed by Eq. 3. A similar approach is used in density boosting. That is, the aim is to construct $F_k = (1-\alpha)F_{k-1} + \alpha h_k$ so that $L(F_k) - L(F_{k-1})$ is maximized (or increased). This can be approximated as follows:

$$L((1-\alpha)F_{k-1} + \alpha h_k) - L(F_{k-1}) \approx \alpha D_{F_{k-1}}(h) \quad \text{Eq. 4}$$

where $$D_{F_{k-1}}(h) = \left. \frac{\partial L((1-\alpha)F_{k-1} + \alpha h)}{\partial \alpha} \right|_{\alpha=0}$$

is the functional derivative of L(F) in the direction from $F_{k-1}$ to $F_k$. This directional derivative computed at each point (w,d) is actually a random variable since it is influenced by the hidden membership variable $c_{wd}$ that indicates whether (w,d) is explained well by $h_k$ (in which case $c_{wd}=0$) or by $F_{k-1}$ (in which case $c_{wd}=0$). In the latter case, the difference in likelihood $L(F_k) - L(F_{k-1})$ is 0. Hence the expected value is maximized as follows:

$$E\{D_{F_{k-1}}(h)\} = p_{wd} * D_{F_{k-1}}(h(w,d)) + (1 - p_{wd}) * 0, \quad \text{Eq. 5}$$

where $p_{wd} = P(c_{wd} = 1 | w, d)$ is the posterior probability of the new aspect given the data. It is estimated by maximizing the complete data log-likelihood (with appropriate constraints, as follows:

$$\left\{ \sum_{wd} n_{wd}(1-p_{wd})\log((1-\alpha)*F_{k-1}(w,d)/(1-p_{wd})) + \right.$$

$$\left. n_{wd} p_{wd} \log(\alpha h_k(w,d)/p_{wd}) \right\} \qquad \text{Eq. 6}$$

with respect to $p_{wd}$ giving the E-step:

$$p_{wd} = \frac{\alpha h_k(w,d)}{(1-\alpha)F_{k-1}(w,d) + \alpha h_k(w,d)}. \qquad \text{Eq. 7}$$

For L(F) given by Eq. 3 the expected directional derivative equals:

$$E\{D_{F_{k-1}}(h)\} = \sum_{wd} n_{wd} p_{wd} \left( \frac{h(w,d) - F_{k-1}(w,d)}{F_{k-1}(w,d)} \right), \qquad \text{Eq. 8}$$

The present system seeks to obtain an h,α at each step so that E{D} is maximized, or is at the very least non-negative. Thus the incremental update involves solving the M-steps:

$$h = \underset{h}{\operatorname{argmax}} \sum_{wd} n_{wd} p_{wd} h(w,d) / F_{k-1}(w,d) \qquad \text{Eq. 9}$$

$$\alpha = \underset{\alpha}{\operatorname{argmax}} \sum_{wd} L((1-\alpha)F_{k-1}(w,d) + \alpha h(w,d)). \qquad \text{Eq. 10}$$

Once h has been estimated, Eq. 10 may be easily solved for α using line search. It should be noted that as a natural consequence of this process, the quantities $1/F_{k-1}(w,d)$ act like weights on the data points. As discussed in the previous examples, data points that are well represented by the current model tend to be down weighted, and data points that are poorly represented tend to be weighted so they are given more attention in the next step.

If the directional derivative is non-positive for all h, then we have reached the optimum. Thus, we obtain the stopping criterion:

$$\sum_{wd} n_{wd} p_{wd} h(w,d) / F_{k-1}(w,d) \le \sum_{wd} n_{wd} p_{wd}. \qquad \text{Eq. 11}$$

A discussion of how to estimate $h_k$ will now be undertaken. Since h(w,d)=p(w|z)p(d|z), let w=p(w|z) over all words w, and d=p(d|z) over all documents d. Introducing the matrix $V=[n_{wd}p_{wd}/F_{wd}]$, Eq. 9 can be rewritten as follows:

$$\min_{w,d} -w^T V d, \qquad \text{Eq. 12}$$

where w and d are d≧0. However, without normalization constraints on w and d the solution to Eq. 12 is unbounded. Hence additional regularizations or restrictions are imposed on the energy in w and d i.e. on $w^T w$ and $d^T d$. The Lagrangian for Eq. 12 is:

$$L(w,d,v,\mu) = -w^T V d + v(w^T w) + \mu(d^T d). \qquad \text{Eq. 13}$$

The solution satisfies the non-negativity constraints, i.e., if w,d are initialized to be positive, they will stay positive. Hence additional Lagrange multipliers are not necessary.

Differentiating L(w,d,v,μ) with respect to w and d gives the following:

$$\frac{\partial L}{\partial w} = -Vd + 2vw, \quad \frac{\partial L}{\partial d} = -V^T w + 2\mu d \qquad \text{Eq. 14}$$

Setting the derivatives from Eq. 14 to equal 0 the following equations are obtained. These have to be iteratively applied to solve for w and d $$2vw = Vd, \quad 2\mu d = V^T w. \qquad \text{Eq. 15}$$

If v=μ=½ it can be seen that w and d are respectively the top left and right singular vectors of V. Thus, this provides a spectral component for the algorithm. Due to its similarity to a spectral algorithm, Eq. 15 is the spectral M-step. The vectors w and d can be normalized after their estimation to give scores that can be interpreted as probabilities.

In a PLSI technique, maximizing Eq. 6 with appropriate constraints yields the M-step:

$$p(w|z) \propto \sum_d n_{wd} p_{wd}, \quad p(d|z) \propto \sum_w n_{wd} p_{wd} \qquad \text{Eq. 16}$$

Temporarily ignoring normalization, Eq. 16 can be rewritten as:

$$w = V1, \quad d = V^T 1, \qquad \text{Eq. 17}$$

where $V=[n_{wd}p_{wd}]$. Comparing this with Eq. 15 it can be see that this M-step in Eq. 17 is essentially one spectral step with w and d initialized to 1. Following Eq. 15, the PLSI technique can be modified in the following way: Before estimating each aspect the data is weighted by 1/F. Then the regular M-step is replaced by the spectral M-step by iterating over w and d until convergence. This is equivalent to replacing V in Eq. 15 by $V=[n_{wd}p_{wd}]$. In practice, both these approaches seem to yield similar results. Thus, in one embodiment, system 100 iterates over the E- and the M-steps in Eq. 7 and Eq. 15, until some convergence criterion is satisfied. As discussed above, these two steps can be thought of as restriction and discovery steps, respectively. Finally, $h=wd^T$ is obtained as the new aspect. Thereafter, α is determined by solving Eq. 10 to obtain the updated model $F_k=(1-\alpha)F_{k-1}+\alpha h_k$.

The pseudocode for one embodiment of handling new data (such as streaming data), once an initial set of models has been generated, is shown in Table 1.

TABLE 1

BUILD ASPECT MODEL (X)
Input: X new input data, Models p(w|z),z = 1...L
Output: P(w,d)modeling X.
K=L; {Current number of themes}
F(w,d) = MAPTOTHEME(X,p(w|z),p(z))
while new themes to be added
    (h(w,d),α) ← DISCOVERTHEME(X,F)
    F(w,d) = (1 − α)F(w,d) + αh(w,d)
    K ← K + 1
end while
return P(w,d) = F(w,d).

As discussed above with respect to FIG. 2, to handle new data, it may be desirable to be able to understand how much of the new data is already explained by the existing models. This is done by MAPTOTHEME mentioned in Table 1 and shown in greater detail in Table 2. Once this is learned, the system can automatically figure out how much of it is novel. Since the function F represents the degree of representation of a pair (w,d) this function is estimated for every data point, which in turn means that how much each point is represented by each aspect h must be determined i.e., p(w|h) and p(d|h) must be estimated for all the new (w,d) pairs in the set of new documents X. The steps for determining how well the new data is modeled by existing models are shown in Table 2 and are:

1. Keep p(w|z) values fixed for all the words that are already seen, only estimating the probabilities of the new words (the p(w|z) vectors are renormalized as needed).
2. Use the spectral projections to estimate p(d|z) while still holding p(w|z) fixed.
3. Compute new F for all X.

TABLE 2

MAPTOTHEME (X,P(w|z),p(z))
Input: X new input data,
p(w|z) and p(z) for all z
Output: p(d|z) and new F(w,d)
[M,N] ← size(X)
{Initialization}
F(w,d) = 1/MN ∀(w,d)
Unravel p(z) to get original αvalues.
T=X
for k=1 to K
   while not converged
   w = p(w|$z_k$)
   d = $T^T$w
   Normalize w,d
   Calculate P using (3.9)
   T = X.*P
   end while
     p(d|$z_k$) = d
     F(w,d) = (1 − α)F(w,d) + αh(w,d)
   end for
return p(d|z) for all z and updated F(w,d).

Once the new documents are folded-in, the new F is used in conjunction with the stopping criterion to determine if any new themes need to be discovered (i.e., if new clusters need to be identified). If required, more iterations are run on the data to discover new themes. Pseudocode showing one embodiment for doing this is set out in Table 3.

TABLE 3

DISCOVERTHEME (X,F)
Input: X data matrix, F current model
Output: new aspect h, mixing portions α
[M,N] ← size(X)
{Initialization}
T=X/F (initial restriction)
w ← rand(M,1); d ← rand(N,1)
w ← w /||w||; d ← d /||d|| w,d > 0
while not converged
  {M-step:} Discovery Step
  w = Td
  d = $T^T$w
  Normalize w,d
  Calculate αusing Eq. 10
  h = wd$^T$
  {E-step:} Restriction Step TABLE 3-continued Compute P using (3.6)
T=X.*P
end while.
return h,α.

Figure 7:
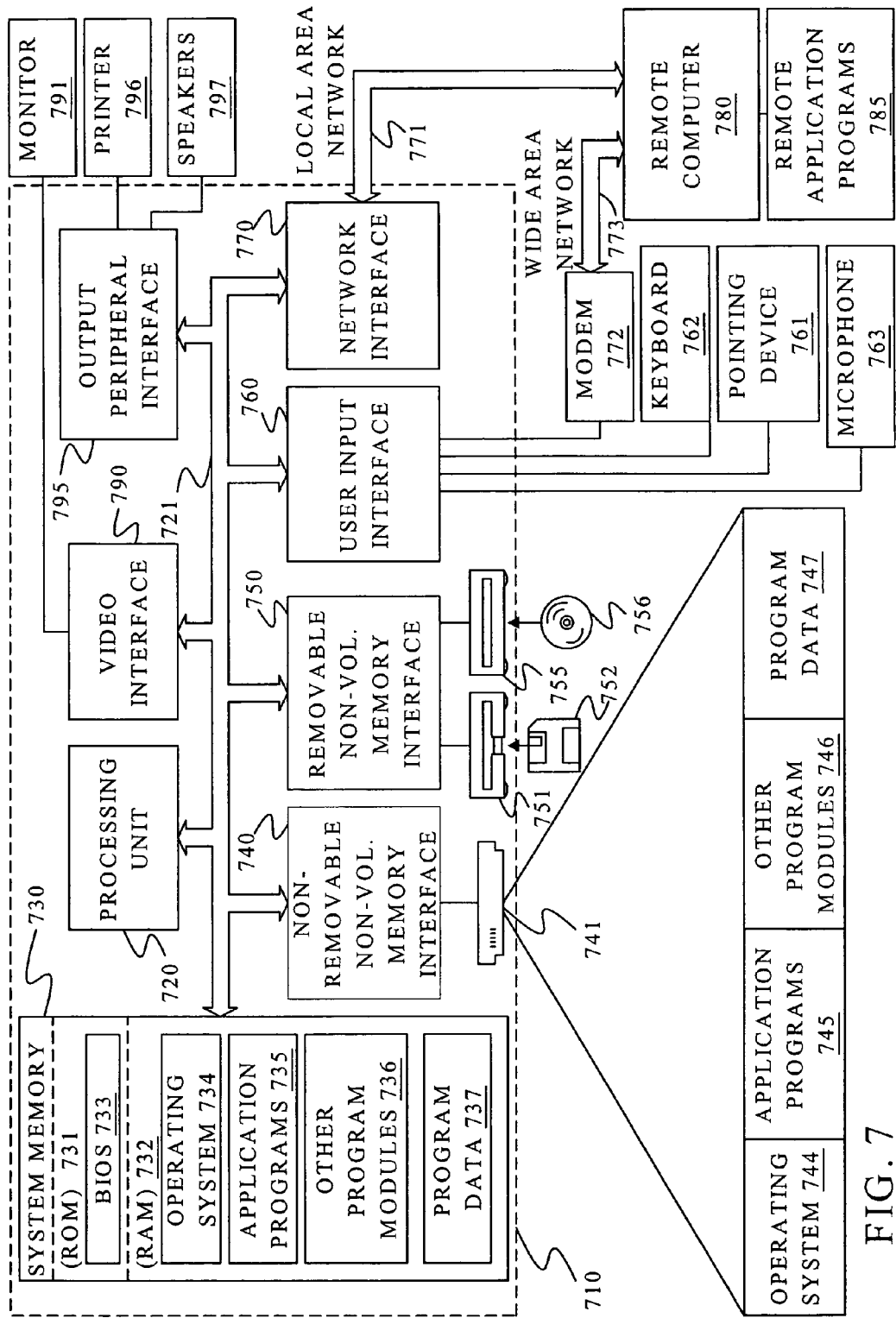
FIG. 7 is a block diagram of one illustrative computing environment.

FIG. 7 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. System 100 can be included here as well.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating a model having a plurality of clusters for describing data each of which describes a plurality of data points of observed data in a data corpus, comprising:
    performing a probabilistic analysis on a portion of the observed data to obtain probabilistically analyzed data including using the probabilistically analyzed data to identify a search space as a subset of the observed data by identifying observed data not sufficiently well described by previously generated clusters;
    within the step of performing the probabilistic analysis, performing a spectral analysis on data in the search space to obtain spectrally analyzed data; and
    generating a new cluster that includes a subset of the data in the search space based on the probabilistically analyzed data and the spectrally analyzed data and adding the cluster to the model.

2. The method of claim 1 wherein generating a cluster comprises:
   generating model parameters indicative of a generative model representative of the observed data.

3. The method of claim 2 wherein generating model parameters comprises:
   generating the model parameters such that they are indicative of a ranking model representative of the observed data.

4. The method of claim 1 wherein performing a probabilistic analysis comprises:
   iteratively repeating the probabilistic analysis, and the spectral analysis within it, to increase a predefined goodness criterion.

5. The method of claim 4 wherein the probabilistic analysis is iteratively repeated until the predefined goodness criterion is optimized according to a predefined optimization algorithm.

6. The method of claim 1 wherein performing a probabilistic analysis comprises:
   performing an estimation maximization (EM) algorithm having an E-step and an M-step and wherein performing a spectral analysis is performed in the M-step of the EM algorithm.

7. The method of claim 1 wherein identifying a search space further comprises:
   weighting the data not sufficiently well described by other clusters such that it is preferentially processed by the spectral analysis to identify clusters in the remaining data.

8. The method of claim 1 wherein a plurality of clusters are generated and wherein the steps of performing the probabilistic analysis and the spectral analysis are each performed once to generate each cluster.

9. The method of claim 4 and further comprising:
   after iteratively repeating the probabilistic analysis, and the spectral analysis within it, receiving additional observed data;
   determining whether the additional observed data is sufficiently represented by previously defined clusters; and
   if not, repeating the probabilistic analysis, with the spectral analysis within it, to define at least one additional cluster to represent the additional observed data.

10. A data clustering system for creating a model including a plurality of clusters including computer executable components stored on a computer storage medium, comprising:
    a probabilistic analysis component receiving observed data and performs a probabilistic analysis of the observed data to generate new cluster identifiers indicative of a plurality of clusters of related data in the observed data, including using the probabilistically analyzed data to identify a search space as a subset of the observed data by identifying observed data not sufficiently well described by previously generated clusters; and
    a spectral analysis component spectrally analyzing data in the search space to generate spectrally analyzed data, the probabilistic analysis component using the spectrally analyzed data in performing the probabilistic analysis to generate the cluster identifiers.

11. The data clustering component of claim 10 wherein the probabilistic analysis component generates the cluster identifiers as model parameters indicative of one or more models that represent the observed data in the clusters.

12. The data clustering component of claim 10 wherein the probabilistic analysis component restricts the observed data into subsets and wherein the spectral analysis component spectrally analyzes the observed data based on the subsets.

13. The data clustering component of claim 12 wherein the spectral analysis component spectrally analyzes the observed data to identify a cluster that represents a portion of the observed data in a given subset of the observed data, and indicates how well the cluster represents each item of the observed data in the given subset.

14. The data clustering component of claim 13 wherein the probabilistic analysis component is restricts the observed data into the subsets by weighting the observed data based on how well the observed data is represented by previously generated clusters.

15. The data clustering component of claim 13 wherein the spectral analysis component identifies one cluster in each subset of the observed data.

16. The data clustering component of claim 13 wherein the probabilistic analysis component is receives additional observed data, after previous observed data has been divided into a set of clusters, and to restrict the additional observed data into additional subsets, the additional subsets including a first subset of the additional observed data that is sufficiently represented by the set of clusters and a second subset for which one or more additional clusters are to be identified.

17. A computer storage medium storing computer readable instructions which, when executed by a computer, cause the computer to perform steps comprising:
    performing an estimation-maximization (E-M) algorithm on observed data to identify cluster parameters indicative of hidden clusters in the observed data that represent the observed data, the E-M algorithm having an E-step in which the observed data is probabilistically divided into a first subset of the observed data that is represented, to a threshold level, by already defined clusters, and a second subset of the observed data that is not represented, to the threshold level, by the already defined clusters, the E-M algorithm having an M-step that identifies an additional cluster in the observed data, given the first and second subsets, that represents at least a portion of the observed data in the second subset at the threshold level; and
    adding the additional cluster to a model that includes the already defined clusters.

18. The computer storage readable medium of claim 17 and further comprising:
    sequentially repeating the E-step and the M-step until clusters are identified that represent the observed data according to a predefined criteria.

19. The computer storage readable medium of claim 17 wherein each time the M-step is performed, it identifies only one additional cluster.

* * * * *